(12) United States Patent
Le Quere et al.

(10) Patent No.: US 7,273,236 B2
(45) Date of Patent: Sep. 25, 2007

(54) QUICK COUPLING

(75) Inventors: Philippe Le Quere, Betton (FR); Christophe Vallee, Crevin (FR)

(73) Assignee: Legris SA, Paris (FR)

( * ) Notice: Subject to any disclaimer, the term of this patent is extended or adjusted under 35 U.S.C. 154(b) by 80 days.

(21) Appl. No.: 11/049,954

(22) Filed: Feb. 4, 2005

(65) Prior Publication Data
US 2005/0167976 A1 Aug. 4, 2005

(30) Foreign Application Priority Data
Feb. 4, 2004 (FR) .................................. 04 01048

(51) Int. Cl.
*F16L 37/00* (2006.01)
(52) U.S. Cl. ...................... 285/321; 285/307; 285/308
(58) Field of Classification Search ................ 285/321, 285/307, 308
See application file for complete search history.

(56) References Cited
U.S. PATENT DOCUMENTS

| | | | | |
|---|---|---|---|---|
| 2,349,180 A | * | 5/1944 | Lamont | ........................ 285/341 |
| 3,361,453 A | | 1/1968 | Brown et al. | |
| 4,063,760 A | | 12/1977 | Moreiras | |
| 4,235,461 A | * | 11/1980 | Normark | ..................... 285/340 |
| 4,848,802 A | * | 7/1989 | Wolf et al. | .................... 285/39 |
| 5,084,954 A | * | 2/1992 | Klinger | ........................ 29/237 |
| 5,351,998 A | * | 10/1994 | Behrens et al. | .......... 285/382.7 |

FOREIGN PATENT DOCUMENTS
EP 0610538 8/1994

* cited by examiner

*Primary Examiner*—David Bochna
(74) *Attorney, Agent, or Firm*—Young & Thompson

(57) ABSTRACT

A quick coupling comprising a body with a conical opening and an outside thread, a nut with a central through orifice and a cylindrical counterbore extending the through orifice and tapped over its portion that is remote from the through orifice, and a conical surface connecting the through orifice to the counterbore, the coupling comprising a ring housed in the counterbore of the nut, the ring having a front face directed towards the thread that is fitted with a sealing gasket whose rear face facing towards the coupling surface co-operates therewith to define a radial expansion housing for a split spring washer.

5 Claims, 1 Drawing Sheet

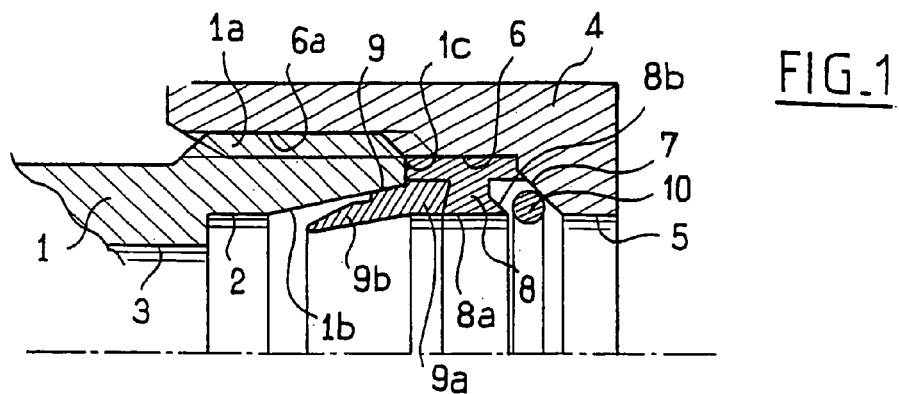
FIG_1
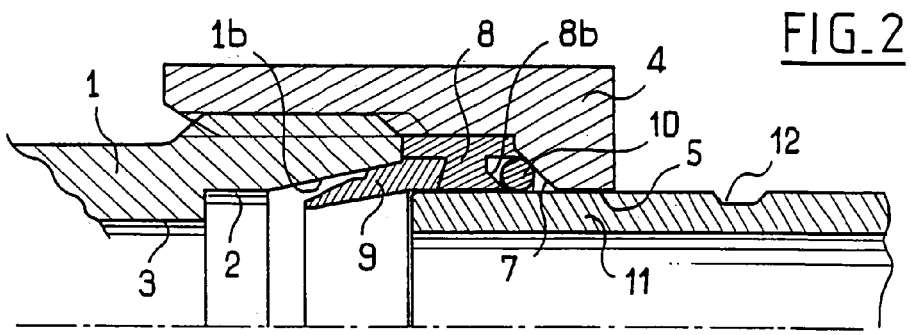
FIG_2
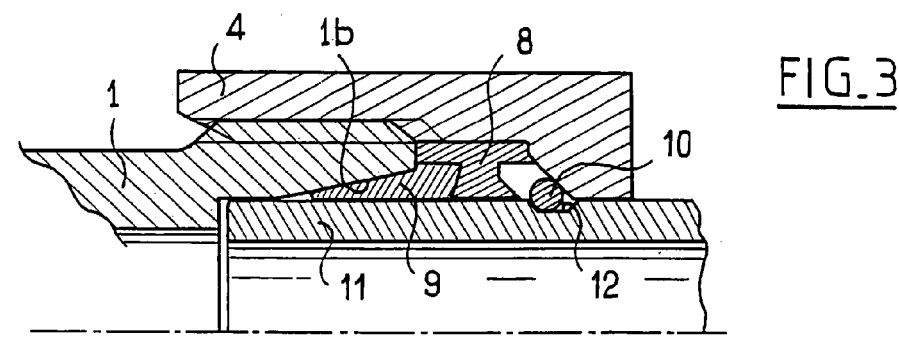
FIG_3
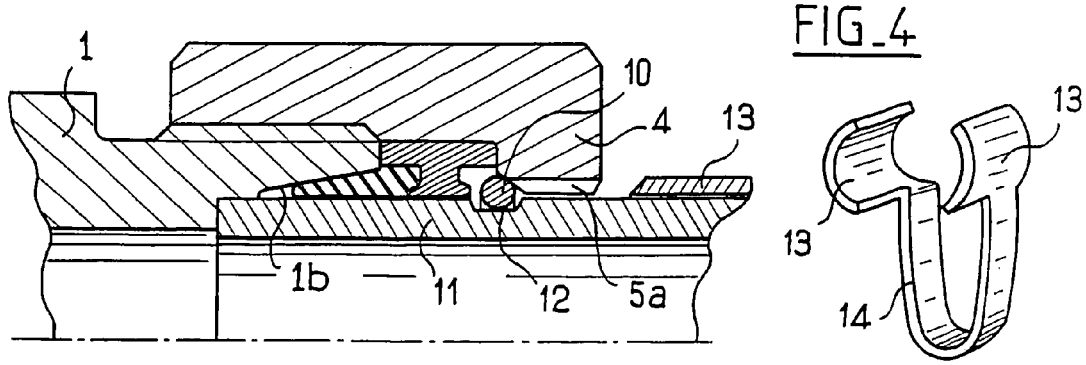
FIG_4

QUICK COUPLING

The present invention relates to a quick coupling.

More precisely, the present invention relates to means for coupling metal tubes for hydraulic and pneumatic transmissions under conditions of use as mentioned ISO standard 8434-1.

BACKGROUND OF THE INVENTION

Such means take the place of "cutting ring" couplings for the purpose, in comparison therewith, of improving and simplifying implementation of the coupling and for making the quality of the coupling independent of the skill and know-how of the installer.

To this end, the invention thus provides a quick coupling comprising a body with a conical opening and an outside thread, a nut with a central through orifice and a cylindrical counterbore extending the through orifice and tapped over its portion that is remote from the through orifice, and a conical surface connecting the through orifice to the counterbore, which coupling comprises a ring housed in the counterbore of the nut, the ring having a front face directed towards the thread that is fitted with a sealing gasket whose rear face facing towards the coupling surface co-operates therewith to define a radial expansion housing for a split spring washer. Naturally, this coupling co-operates with a rigid coupling endpiece that may be fitted to the end of a hose or that may be constituted by the end of a rigid tube that is preferably made of metal, the endpiece being provided with an external groove into which the spring washer springs elastically when coupling is implemented. The groove is made beforehand in the endpieces. Nevertheless, it could be made in situ on a tube end, e.g. an end that was previously connected by means of a cutting-ring coupling.

OBJECTS AND SUMMARY OF THE INVENTION

It will thus be understood that the invention is advantageous as a substitute for a cutting-ring coupling, since tools for making a groove in the end of a tube are much less difficult to handle than are the tools needed to make a coupling with a cutting-ring coupling.

In a preferred embodiment, the sealing gasket presents an annular root portion for co-operating with the ring, and an annular nose which is housed in the conical opening of the body when the ring is clamped by the nut against the body.

The advantage of this shape is that the gasket used co-operates with the tube and with the body via large areas which ensure very good leaktightness even though the gasket is flattened with little pressure, particularly if the coupling is made by hand, i.e. while deploying low levels of force.

When in the free state, the gasket possesses a diameter at its root close to the ring that is not less than the inlet diameter of the conical opening in the body. By means of this characteristic, it is ensured that a portion of the gasket is present that is either pinched between the ring and the body, or else is prestressed by being packed inside the entry portion of the conical opening in the coupling body at the moment when the nut is tightened on the body prior to the tube or the endpiece for connection being pushed in, thereby stressing the inside ring against the body. The presence of this prestress or pinching ensures improved leaktightness of the parts of the coupling relative to the outside.

The thickness of the nose decreases towards its free end so as to occupy as well as possible the space between the tube or endpiece and the conical opening of the coupling, and thus have maximum contact area between the gasket and each of the two elements.

Finally, the area of the radial space (groove) for expansion of the spring gasket carried by the ring is conical, being substantially parallel to the conical coupling surface of the nut. This provides a groove with flanks sloping towards the rear of the coupling, in a direction opposite from that in which the tube or endpiece is pushed in.

Other characteristics and advantages of the invention appear from the following description of an embodiment.

BRIEF DESCRIPTION OF THE DRAWINGS

Reference is made to the accompanying drawings, in which:

FIG. 1 is a half-view in section of a quick coupling in accordance with the invention in its operational state;

FIG. 2 and FIG. 3 are views showing how the coupling co-operates with the end of a tube or the end of an endpiece; and FIG. 4 is a diagram showing the dispositions that enable the endpiece or the tube to be disconnected without dismantling the coupling.

MORE DETAILED DESCRIPTION

The coupling of the invention comprises a body 1 presenting an outside thread 1a and an inlet opening 1b that is conical with a standard slope of 24°. This conical opening 1b converges towards the inside of the coupling 1 and terminates in a counterbore 2 into which an internal channel of the body 1 and referenced 3 opens out.

Reference 4 designates a nut body which possesses a through orifice 5 for a tube or for an endpiece, a counterbore 6 connected to the through orifice 5 by a diverging conical wall 7 remote from the orifice 5, the counterbore 6 having an inside thread or tapping 6a for co-operating with the thread 1a on the body 1.

In the counterbore 6, the coupling includes a ring 8 whose inside surface 8a is of the same diameter as the counterbore 2 in the body 1 and as the through orifice 5 of the nut 4. This ring 8 can be clamped by the nut 4 against the end face 1c of the body 1, defining the inlet to the conical opening 1b.

The ring 8 carries an annular sealing gasket 9 which possesses a root portion 9a and a nose 9b. The root portion 9a is held at the front of the ring 8 by any appropriate fastener means, and at this level the outside diameter of said root portion 9a is at least equal to or greater than the diameter formed by the intersection between the face 1c and the surface 1b of the conical opening.

The nose 9b of the gasket projects outwards and forwards from the ring 8, and its thickness decreases towards its free end.

On its rear side, the ring 8 presents a conical surface 8b facing the conical surface 7 of the nut 4, the conical surface 8b co-operating with the surface 7 to define a groove in which a split spring washer 10 can expand radially in known manner. In the free state, the inside diameter of this toroidal washer is less than the diameter of the passage 5, of the inside surface 8a of the ring 8, and of the counterbore 2.

As can be seen in FIGS. 2 and 3, a tube or endpiece 11 carries a groove 12 and is inserted progressively into the coupling of the invention. The outside diameter of the tube 11 is substantially equal to the diameter of the orifice 5, to the inside diameter of the ring 8, and to the diameter of the counterbore 2. The inside diameter of the tube is substantially the same as the diameter of the passage 3 inside the body 1.

Before beginning to insert the endpiece or tube 11 into the coupling, the nut 4 is initially tightened onto the body 1. In this operation, prestress is established in the root portion 9*a* of the gasket 9, which can lead either to the gasket being pinched lightly between the face 1*c* of the body 1 and the ring 8, or more generally to the gasket swelling inwards, thereby enabling it, starting from said root portion, to provide intimate contact with the endpiece or the tube 11.

On insertion, the endpiece or the tube 11 causes the washer 10 to expand radially so it is received between the surfaces 7 and 8*b* while remaining in spring contact with the tube 11. Continued engagement causes the nose of the tube or of the endpiece to reach the gasket 9 and expand its nose 9*b* so as to press it against the conical surface 1*b*. Finally, the nose of the tube reaches the counterbore 2. In this position, as shown in FIG. 3, the washer 10 springs elastically into the groove 12 and constitutes a kind of clip preventing the tube from moving axially relative to the coupling. The gasket 9 is sandwiched between the tube or endpiece 11 and the conical surface 11*b* over large annular contact areas with the tube and with the body 1 of the gasket, such that good leaktightness is ensured in this space between the body and the tube by a gasket which forms a kind of wedge filling this space.

FIG. 4 shows an embodiment that constitutes a variant of the preceding figures in which the passage 5 for the tube or the endpiece 11 is provided with two circumferential setbacks 5*a* to enable a pusher comprising two portions 13 united by a handle 14, for example, to be slid into these setbacks in order to reach the washer 10 and force it to open out and be received between the surfaces 7 and 8*b*. This extracts the washer from the groove 12, and the tube or the endpiece 11 can then be extracted from the coupling by moving relative thereto in the longitudinal direction. This is not the preferred method of disconnection. This is achieved merely by dismantling the coupling by unscrewing the nut 4 from the body 1. It is then possible to access the ring 8, the gasket 9, and the washer 10 which can then be separated from the coupling and which can then be replaced either by a ring 8, a washer 10, and a gasket 9, or by a conventional cutting ring in order to establish a coupling of the kind that is much more frequent in this type of installation. Under such conditions, it is preferable to install a tube end or an endpiece 11 having no groove 12.

What is claimed is:

1. A quick coupling comprising a body with a conical opening and an outside thread, a nut with a central through orifice and a cylindrical counterbore extending the through orifice and tapped over its portion that is remote from the through orifice, and a conical surface connecting the through orifice to the counterbore, wherein the coupling comprises a ring housed in the counterbore of the nut, the ring having a front face directed towards the thread that is fitted with a sealing gasket and having a rear face facing towards the conical surface which co-operates therewith to define a radial housing and an elastic split retaining ring located in said housing and radially expansible therein.

2. A coupling according to claim 1, wherein the sealing gasket has an annular root portion for co-operating with the ring, and an annular nose which is housed in the conical opening of the body when the ring is clamped by the nut against the body.

3. A coupling according to claim 2, wherein the thickness of the nose decreases towards its free end.

4. A coupling according to claim 2, wherein, in the free state, the sealing gasket has an outside diameter in the vicinity of the ring which is at least equal to the inlet diameter of the conical opening in the body.

5. A coupling according to claim 1, wherein said rear face (8*b*) carried by said ring (8) facing said conical surface (7) of the nut (4) is conical and substantially parallel to said conical surface (7) of the nut (4).

* * * * *